(12) United States Patent
Raasakka

(10) Patent No.: US 6,758,517 B1
(45) Date of Patent: Jul. 6, 2004

(54) COLLAPSIBLE SUNROOF SUNSHADE

(75) Inventor: John Raasakka, Howell, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 0 days.

(21) Appl. No.: 10/452,300

(22) Filed: Jun. 2, 2003

(51) Int. Cl.$^7$ .................................................. B60J 7/00
(52) U.S. Cl. .................. 296/214; 160/84.03; 160/84.06
(58) Field of Search .............................. 296/214, 97.8; 160/84.03, 84.06

(56) References Cited

U.S. PATENT DOCUMENTS

| | | | | |
|---|---|---|---|---|
| 4,763,713 A | * | 8/1988 | Kraus | 160/172 R |
| 4,872,722 A | | 10/1989 | Farmont | |
| 4,883,304 A | * | 11/1989 | Elliott | 296/97.8 |
| 4,978,165 A | | 12/1990 | Schreiter | |
| 5,794,679 A | * | 8/1998 | Williams et al. | 160/46 |
| 6,508,507 B2 | | 1/2003 | Raasakka | |

FOREIGN PATENT DOCUMENTS

| | | | | |
|---|---|---|---|---|
| DE | 3904486 | * | 3/1990 | 296/214 |
| FR | 2372951 | * | 6/1978 | 160/84.06 |
| GB | 533128 | * | 2/1941 | 160/84.06 |
| JP | 0258213 | | 10/1988 | |

* cited by examiner

Primary Examiner—Dennis H. Pedder
(74) Attorney, Agent, or Firm—Carlson, Gaskey & Olds

(57) ABSTRACT

A sunshade for a sunroof assembly includes two opposed halves which accordion fold to a collapsed position. The collapsed position of the sunshade is within a projected area of the sunroof panel. Thus, room within the roof, in addition to the room taken by the sunroof panel, is not require for the sunshade when in its open position.

11 Claims, 2 Drawing Sheets

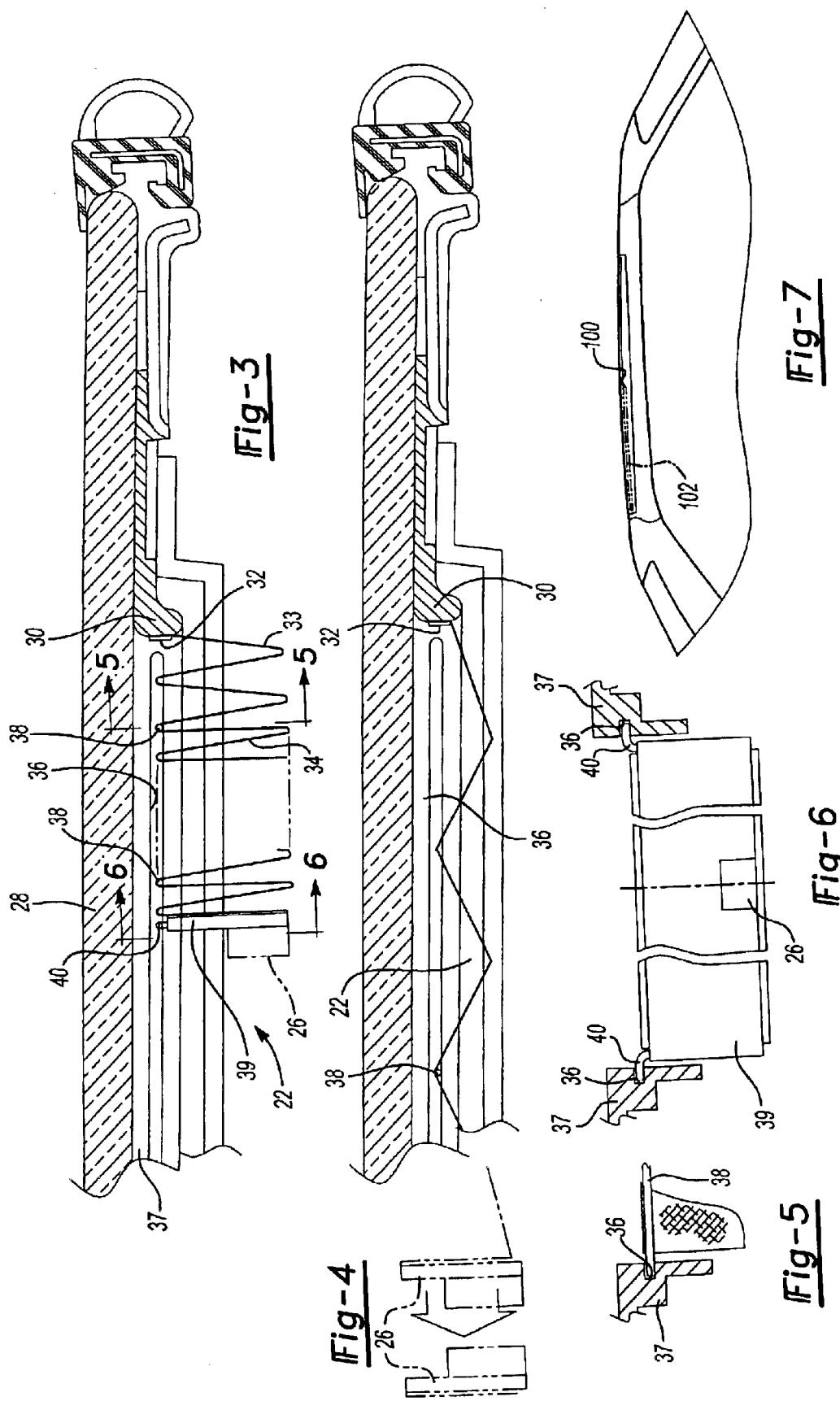

COLLAPSIBLE SUNROOF SUNSHADE

BACKGROUND OF THE INVENTION

This application relates to a vehicle sunshade that accordion folds to an open position such that it does not require space outside of an envelope defined by the sunroof when in the open position.

Vehicle sunroofs are provided in many modern vehicles. A typical sunroof has a transparent sunroof panel that is moved between open and closed positions within a vehicle roof. In the open position, the sunroof panel is moved outwardly of the opening in the roof, and typically into a space rearward of the roof opening. The space is typically above the headliner but beneath the roof.

Sunroofs are also provided with a sunshade. The sunshade moves with the sunroof panel and selectively blocks sunlight coming through the sunroof panel. Thus, if the occupant of the vehicle does not wish to be exposed to sunlight through the sunroof panel, the sunshade is closed, blocking sunlight. When the sunroof panel is moved to its open position, the sunshade typically moves with the sunroof panel into the retracted open position.

However, there are times when the occupant would like the sunroof panel closed, but would also like sunlight to pass into the cab of the vehicle. Thus, the sunshade is movable relative to the sunroof panel to its own open position. Typically, the sunshade slides as a planar member rearwardly of the opening in the roof. At the same time, the sunroof panel is within its normal space. Thus, to accommodate movement of the sunshade to its open position, there must be room to accommodate the sunshade to move rearwardly relative to the sunroof panel.

Of course, in modern vehicle design, efficient use of space is a very clear design directive. Thus, it would be desirable not to have the requirement of additional space for movement of the sunshade to its open position between the headliner and roof.

In one proposed sunshade, the sunshade "rolls" into a receptacle. While this proposed sunshade does not require the space in the area mentioned above, it would be desirable to simplify the arrangement.

SUMMARY OF THE INVENTION

In a disclosed embodiment of this invention, a collapsible sunshade accordion folds to an open position at which it is still generally within the projected area of the sunroof panel. Thus, additional space is not required between the headliner and the vehicle roof. Instead, the sunshade is received in its open position, generally within the projected area defined by the glass panel.

Again, in the preferred embodiment, the sunshade has an accordion fold design such that it may be folded to at least one side of the sunroof panel. In a more preferred embodiment, there are two halves to the sunshade, each of which accordion fold to opposed sides, and most preferably to lateral sides of the sunroof panel.

In further details, the collapsible sunshade moves with the sunroof panel, and includes guide pins that are received in a slot in a frame for the sunroof panel. The guide pins are preferably mounted on selected ones of the accordion folds, and do not need to be associated with each accordion fold. Further, some locking structure preferably snaps the two sunshade halves together when in the closed position.

These and other features of the present invention may be best understood from the following specification and drawings, the following of which is a brief description.

BRIEF DESCRIPTION OF THE DRAWINGS

FIG. 3 is a cross-sectional view through a sunroof assembly.

FIG. 4 is a view showing the sunroof assembly in its closed position.

FIG. 5 is a partial cross-sectional view along line 5—5 as shown in FIG. 3.

FIG. 6 is a cross-sectional view along line 6—6 as shown in FIG. 3.

FIG. 7 schematically shows the movement of the sunroof between its open and closed positions.

DETAILED DESCRIPTION OF THE PREFERRED EMBODIMENT

Figure 1:
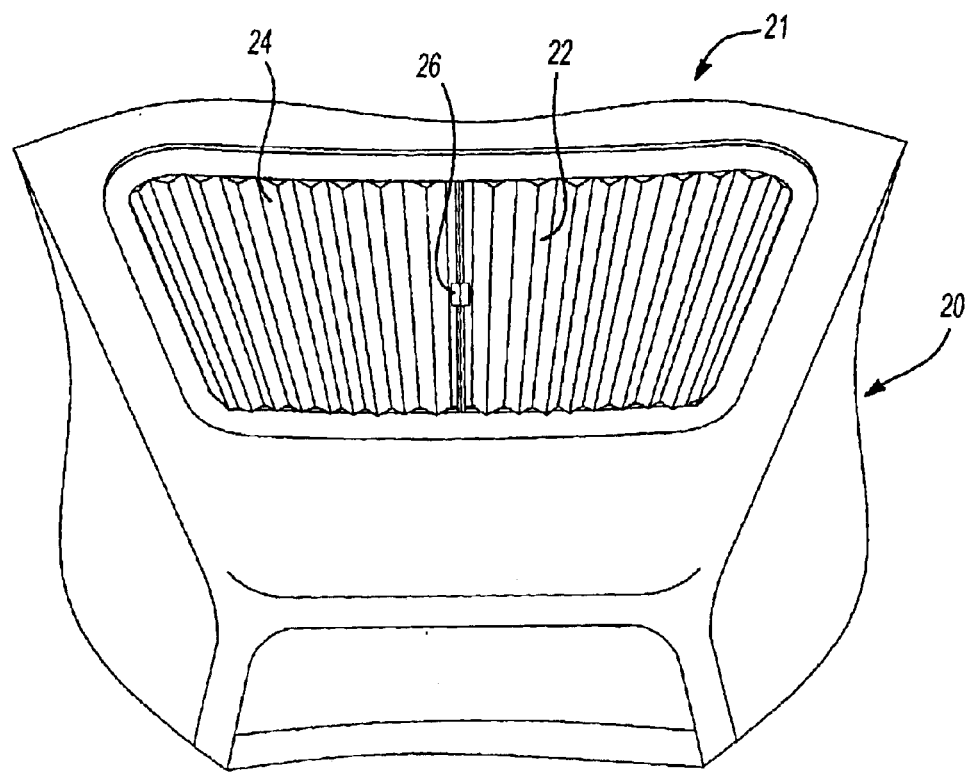
FIG. 1 is a perspective view of an interior of a vehicle incorporating the inventive sunshade design.

FIG. 1 shows the interior or cab 20 of a vehicle. A sunshade 21 is formed by two collapsible halves 22 and 24. The two halves 22 and 24 are joined at latch 26.

Figure 2:
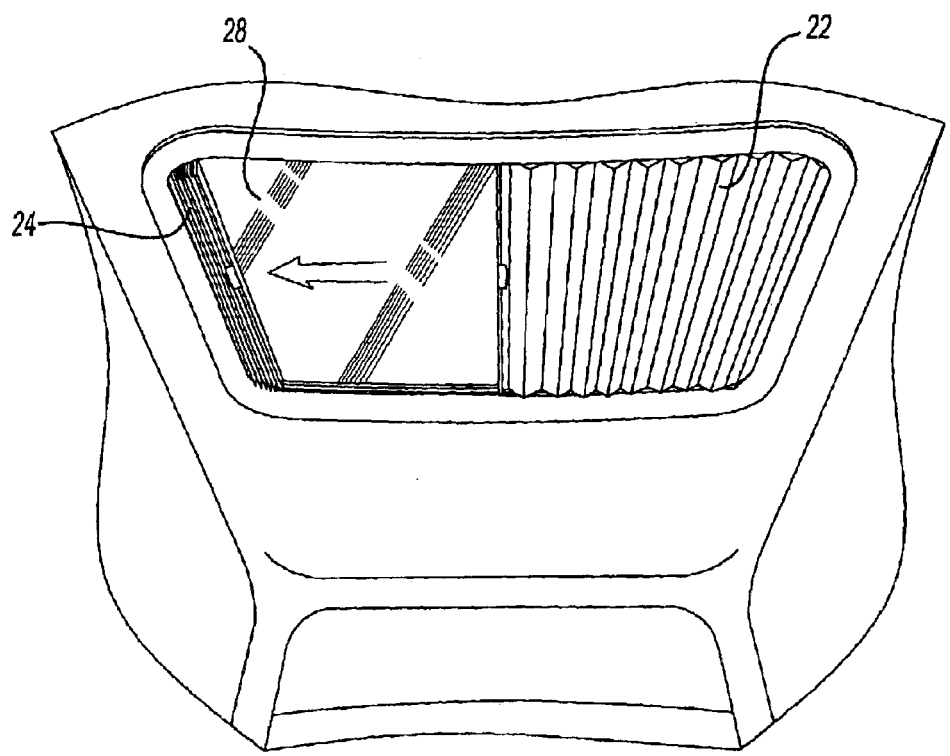
FIG. 2 shows one-half of the inventive sunshade in its open position.

As shown in FIG. 2, one half 24 has been accordion folded to a collapsed position, leaving half 22 in the closed position. As can be appreciated, with half 24 in the open position, the glass sunroof panel 28 is exposed and sunlight can now enter the cab of the vehicle.

FIG. 3 shows the half 22 in a partially collapsed position. A frame 30 for the transparent sunroof panel 28 has a stake 32 connecting a first accordion fold 33 to the frame. As can be appreciated from this figure, a number of additional accordion folds 34 allow movement to the collapsed position. A slot 36 in a portion 37 of the frame 30 extends from left to right across the cab of the vehicle. The slot 36 receives guides, such as pins 38, that selectively support spaced ones of the accordion folds 34. Thus, as the half 22 is moved to its collapsed position, the guides 38 move within slot 36, supporting and guiding the movement of the half 22.

FIG. 4 shows the sunshade moved to its closed position. As shown schematically, snaps 26 on the two halves are secured together to hold the sunshade at the closed position.

FIG. 5 shows a detail of the pin 38 movable within the slot 36.

FIG. 6 shows the forward most portion 39 of the half 22. Portion 39 may form a part of the latch 26. As shown, there are spaced guide pins 40 at each of the forward and rear sides of the sunroof, and received within similar frame portions 37 and associated slots 36.

As shown schematically in FIG. 7, the sunroof is movable from its closed position at which it covers an opening 100 in a vehicle roof, and to an open position, shown in phantom at 102 at which the opening is exposed. The sunshade halves 22 and 24 move with the sunroof when moved to its open position 102. However, when the sunroof is in its closed position, the sunshade can move to its collapsed position, thus allowing light to pass through the glass panel and into the cab of the vehicle. The structure for moving the sunroof between its open and closed positions is as known in the art, and forms no portion of this invention. As is known, the movement of the sunroof is along the direction of travel of the vehicle having the sunroof. Thus, the sunshade halves 22 and 24 fold in a direction perpendicular to the direction of movement of the window.

As can be appreciated from the figures, when the sunshade is in its collapsed position, there is a certain small amount of space directly below the panel 28 that is taken up by the collapsed sunshade. However, the sunshade is retained within the projected area of the panel 28 in this collapsed position. Additional space outward of the projected area of the panel 28 is not required to accommodate the collapsed position.

Although a preferred embodiment of this invention has been disclosed, a worker of ordinary skill in the art would recognize that certain modifications would come within the scope of this invention. For that reason, the following claims should be studied to determine the true scope and content.

What is claimed is:

1. A vehicle sunroof assembly comprising:

a sunroof panel with an edge frame;

a sunshade mounted on said edge frame panel for selectively moving between open and closed positions, said sunshade having a plurality of accordion folds such that it is movable to collapse and define said open position, with said sunroof panel being exposed, with said sunshade extending to a closed position at which it covers said sunroof panel, and collapsing to an open position at which it is received at at least one side of said edge frame, exposing a central portion of said sunroof panel.

2. A vehicle sunroof assembly as set forth in claim 1, wherein said sunshade collapses with an accordion fold such that it extends away from a central area of said sunroof panel, but within an edge of said sunroof panel.

3. A vehicle sunroof assembly as set forth in claim 2, wherein there are a pair of sunshade halves, with said sunshade halves collapsing to opposed sides of said frame.

4. A vehicle sunroof assembly as set forth in claim 3, wherein said sunshade halves each accordion fold to the open position.

5. A sunroof as set forth in claim 3, wherein said two sunshade halves include a snap lock that snaps said sunshade halves together in said closed position.

6. A vehicle sunroof assembly as set forth in claim 1, wherein at least some accordion folds on said sunshade include guide pins received in a slot on said sunroof frame, said guide pins moving with said sunshade in said slot between said open and closed position.

7. A vehicle sunroof assembly comprising:

a sunroof panel mounted within an edge frame;

a sunshade provided by two sunshade halves, each sunshade half being formed by a plurality of accordion folds movable to a closed position at which they abut, and being collapsible on said accordion folds to an open position at which they are collapsed at opposed sides of said sunroof panel, at least some of said accordion folds on each of said sunshade halves including guide pins, said guide pins being received in a slot in said sunroof panel edge frame, said guide pins moving with said sunshade halves in said slot between said open and closed positions, and said sunshade halves moving to side surfaces of the edge frame in said open position, whose side surface being defined as being parallel to a direction of movement of said sunroof panel between open and closed positions within a vehicle roof which is to receive said sunroof panel.

8. A vehicle sunroof as set forth in claim 3, wherein said sunshade halves move to side surfaces and in said open position, said side surface being defined as being parallel to a direction of movement of said sunroof panel between open and closed positions within a vehicle roof which is to receive said sunroof panel.

9. A vehicle sunroof assembly as set forth in claim 1, wherein said sunshade is fixed to one side of said edge frame for said sunroof panel, and an opposed side of said sunshade being movable relative to said sunroof panel.

10. A vehicle sunroof assembly as set forth in claim 9, wherein said sunshade consists of two halves, with each of said two halves being fixed to said edge frame for said sunroof panel at opposed lateral sides of said sunroof panel, said halves being movable toward each other to contact each other at said closed position.

11. A vehicle sunroof assembly as set forth in claim 7, wherein at least one said sunshade half is fixed to one said side surface, and an opposed side of said sunshade half being movable relative to said sunroof panel.

* * * * *